June 16, 1964  R. N. THURSTON  3,137,833
PIEZORESISTIVE STRESS GAGES
Filed April 25, 1961

INVENTOR
R. N. THURSTON
BY
ATTORNEY

United States Patent Office

3,137,833
Patented June 16, 1964

3,137,833
PIEZORESISTIVE STRESS GAGES
Robert N. Thurston, Whippany, N.J., assignor to Bell Telephone Laboratories, Incorporated, New York, N.Y., a corporation of New York
Filed Apr. 25, 1961, Ser. No. 105,341
12 Claims. (Cl. 338—6)

This invention relates to stress gages. More particularly it relates to semiconductor gages having a prescribed construction and crystallographic configuration which provide new and unexpected stress gage functions.

Typical semiconductor stress gages presently in use utilize the simple longitudinal piezoresistive coefficient, i.e., the piezoresistive measurements of the current and voltage (piezoresistive change) are made in the direction of the strain to be measured. The usual gage construction is merely a semiconductor strip affixed to the body in which stresses are being measured and carrying two electrical leads contacting the extremities of the strip to accommodate the test current through the strip. In using these gages to measure stress in a conducting body, care must be taken to insulate the semiconductor strip from the body since, generally, the conductivity of the body being analyzed is sufficiently greater than the semiconductor to short the test current through the body thus preventing a proper measurement of the piezoresistive response in the semiconductor.

The present invention teaches a gage construction which provides sensitive piezoresistive measurements with unexpected advantages and simplicity. This gage form is essentially a flat thin wafer of semiconductor carrying one electrical lead attached to one flat surface. The piezoresistive measurement is made through the thickness of the semiconductor wafer. This gage construction requires only one electrical contact affixed to the semiconductor body and permits the gage to be attached to the test medium being measured by a conducting or non-insulating adhesive such as solder. In this form, a gage attached to a conductive medium utilizes the medium as a conductor for the test current and the second electrical lead can contact any convenient point on the medium being tested.

Various aspects of this gage construction may perhaps be more easily understood when considered in conjunction with the drawing in which.

Figure 2A:
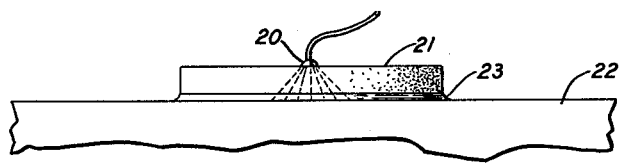
FIG. 2A is a schematic representation of the current flow characteristics in one form of device design showing the undesirable current path resulting from the use of an electrode having a small contact area relative to the gage thickness.
Figure 2B:
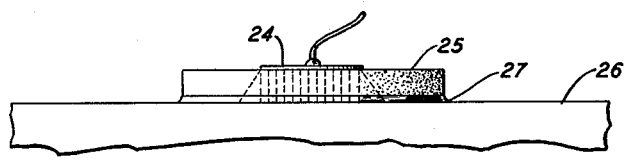
Figure 3:
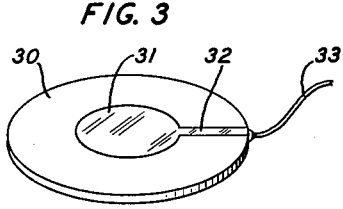

FIG. 2B is a schematic representation similar to FIG. 2A showing a desirable electrode contact area with the attendant proper current flow characteristics; and FIG. 3 is a perspective illustration of an electrode adapted to be inserted between the semiconductor wafer and the member being tested to accommodate the test current through the thickness of the wafer in those applications where it is desired to avoid using the member as an electrode, e.g., where the member is a nonconductor.

Figure 1:
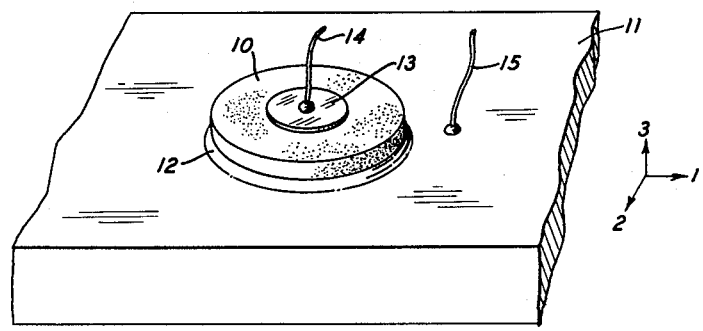
FIG. 1 is a perspective view of a gage constructed according to the teachings of this invention showing the gage affixed to a conductive member in which strains are to be measured.

FIG. 1 shows a semiconductor wafer 10 affixed to the member 11 in which stresses or strains are to be measured. The adhesive 12 is a conducting medium, for instance, solder. Contact 13 is alloyed to the top face of the wafer as shown and lead 14 is attached to the contact. The remaining lead 15 contacts the base medium 11 at any desired point. The leads are connected to a conventional bridge circuit (not shown) adapted to measure the piezoresistive response of the semiconductor. This response is simply related to strains and stresses in the medium 11.

In this device biaxial strains in the medium, indicated by arrows 1 and 2, will be detected by the gage by utilizing the transverse piezoresistive coefficient. A discussion of this coefficient and various gage forms utilizing the transverse piezoresistive effect will be found in application Serial No. 96,463 filed March 17, 1961 and application Serial No. 105,355, filed April 25, 1961. In the event that a non-conducting medium is being analyzed, a conductive spacer may be interposed between the gage and the medium and the lead 15 attached to the conductive spacer as will be hereinafter discussed.

Appropriate crystallographic orientations for the semiconductor material of the gages of this invention are contained in the following table. In each case the designations "direction 1" and "direction 2" are the crystallographic directions of the semiconductor to be oriented with respect to the principal stress directions such as directions 1 and 2 indicated in FIG. 1. The "direction of measurement" is the "3" crystallographic direction and corresponds to the direction of the arrow designated "3" in FIG. 1.

TABLE I

| Example | Material | Resistivity, ohm cm. | Direction of Measurement | Direction 1 | Direction 2 |
|---|---|---|---|---|---|
| 1 | p-Si | ~8 | 1$\bar{1}$0 | 111 | 11$\bar{2}$ |
| 2 | n-Ge | ~1 | 1$\bar{1}$0 | 111 | 11$\bar{2}$ |
| 3 | p-Ge | ~1 | 1$\bar{1}$0 | 111 | 11$\bar{2}$ |
| 4 | n-Ge | ~1 | 110 | 1$\bar{1}$0 | 001 |
| 5 | p-Ge | ~1 | 110 | 1$\bar{1}$0 | 001 |
| 6 | p-Si | ~8 | 110 | 1$\bar{1}$0 | 001 |

The stress value of a simple stress as measured by gages utilizing the orientations of Examples 1, 2 and 3 can be calculated from the equation:

$$\frac{\Delta\rho}{\rho_0}=\sigma_1\tfrac{1}{3}(\pi_{11}+2\pi_{12}-\pi_{44})+\sigma_2\tfrac{1}{6}(\pi_{11}+5\pi_{12}-\pi_{44})$$
$$+\tau_{12}\sqrt{\frac{2}{3}}(\pi_{11}-\pi_{12}-\pi_{44}) \quad (1)$$

where $\Delta\rho=\rho-\rho_0$ is the measured resistance variation ($\rho_0$=zero stress resistivity), $\sigma_1$ and $\sigma_2$ are the stress components in the 1 and 2 directions respectively, $\tau_{12}$ is the shear stress related to the 1 and 2 directions and $\pi_{11}$, $\pi_{12}$ and $\pi_{44}$ are the fundamental piezoresistive coefficients of the material. Typical values of these fundamental coefficients are given in the following table:

TABLE II

Approximate Piezoresistance Coefficients at Room Temperature

| Material | Resistivity | $\pi_{11}$ | $\pi_{12}$ | $\pi_{44}$ |
|---|---|---|---|---|
| | | (10$^{-12}$ cm.$^2$/dyne) | | |
| n-Ge | ~1 | (*) | (*) | −138 |
| p-Ge | ~1 | (*) | (*) | +97 |
| n-Si | ~12 | −102 | +53 | (*) |
| p-Si | ~8 | (*) | (*) | +138 |

*Essentially zero.

For the orientations given in Examples 4–6 the transverse piezoresistive coefficient for the 2 direction is essentially zero and the shear coefficient is precisely zero. Thus, gages constructed according to these embodiments will be insensitive to shear stresses and any stresses in the 2 direction and will provide a measurement of a pure directional stress in the 1 direction. These gage forms are particularly useful where it is desired to measure unidirectional stresses independent of the transverse strains resulting from the Poisson effect. The longitudinal stress value may be calculated according to the equation:

$$\frac{\Delta \rho}{\rho_0} = \sigma_1 \cdot \tfrac{1}{2}(\pi_{11} + \pi_{12} - \pi_{44}) \qquad (2)$$

where $\sigma_1$ is the stress value in the 1 direction.

Since in these gage forms the piezoresistive measurement depends on the transverse piezoresistive effect, the current flow path must be essentially transverse to the plane of the biaxial strains. FIGS. 2A and 2B illustrate schematically the problem of obtaining transverse current flow. In FIG. 2A the electrical contact 20 is small compared with the thickness of the semiconductor body 21. As indicated, the predominant current flow to the conductive base 22 is not in the desired perpendicular direction and the spreading of current results in an inaccurate piezoresistive measurement. In contrast to this, FIG. 2B schematically shows the current flow obtained when the contact 24 is relatively large as compared with the thickness of the semiconductor body 25. Here the current flow to the conductive base 26 is predominantly perpendicular and an accurate measurement of the transverse piezoresistive effect can thus be obtained. In each case the adhesive 23 and 27 is preferably more conductive than the semiconductor bodies 21 and 25.

Accordingly, where the base or body to which the gage is affixed is utilized without further precautions as a conductor for the test current, the diameter (or width) of the contact should preferably be at least twice the thickness of the semiconductor body in order to insure the desired transverse current flow.

As previously pointed out a conductive spacer may be utilized between the gage and the body being measured in which event the test current passes through the semiconductor body and the spacer. In this form the precaution indicated by FIGS. 2A and 2B must be observed. However, the spacer may be constructed as shown in FIG. 3 in which case the current flow lines will necessarily be restricted to the desired flow path.

FIG. 3 shows a spacer designed to eliminate excessive current spreading and insure a proper current flow path. The spacer 30 is constructed of a material insulating with respect to the semiconductor gage material but includes a conductive portion 31 and a narrow conducting path 32 connecting the conductive portion 31 with the external lead 33. This spacer is adapted to be inserted between the gage and the test body. If the area and geometry of the conductive portion 31 is essentially a vertical projection of the contact area of the electrode (e.g. 13 of FIG. 1), then vertical or transverse current flow lines will be insured. In order to preserve the faithful transfer of stresses from the test body to the gage material, this spacer 30 should be as thin as possible. It is apparent that, whenever possible, operation without such a spacer will be both more convenient and economical.

It should be appreciated that while the gage form has assumed a disc shape for the purposes of this discussion, the actual size and geometry of the semiconductor body is not of consequence. Since the piezoresistive measurement is through the thickness of the body of the gage only such size as will accommodate this measurement is required. However, where the gage body is very small compared to the size of the electrode, edge effects become troublesome. Accordingly, in general, the minimum dimension of the gage body as measured in the plane of the gage, should preferably be at least twice the corresponding minimum dimension of the electrode.

In these gage constructions where the gage is affixed to a medium being tested, care must be taken to insure a faithful translation of the stresses in the medium to the piezoresistive test body. To this end the gage bodies of this invention preferably have a minimum planar dimension of ten times the gage thickness.

The term wafer used in this specification and the appended claims is intended to define a thin, planar body of any desired shape and accordingly, should not be construed as prescribing any shape or form to the planar cross section.

It is understood that this invention relies on the limitation, among others, that the piezoresistive measurement is made transverse to the plane of the semiconductor wafer, i.e., through its thickness. However, all such measurements which deviate from this otherwise exact limitation and still provide a piezoresistive response of the character indicated herein with its attendant advantages are to be properly considered within the scope of the language of the appended claims designating the direction of piezoresistive measurement as "approximately normal" to the plane of the gage wafer. Within this context are measurements of stresses in the plane of the gage wafer and also shear stresses such as thickness shear.

Various other modifications and embodiments of the gage forms described herein will become apparent to those skilled in the art. All such variations and deviations, which basically rely on the teachings by which this invention has advanced the art, are properly considered to be within the scope of this invention.

What is claimed is:

1. A piezoresistive semiconductor stress gage comprising a flat piezoresistive semiconductor wafer, means for subjecting said wafer to stresses in the plane of the wafer, and means including electrical contacts associated with the semiconductor wafer for electrically measuring the piezoresistive effect responsive to said stresses in a direction approximately normal to the plane of the wafer.

2. The gage of claim 1 wherein the minimum planar dimension of said wafer is at least 10 times the thickness of the wafer.

3. The gage of claim 1 wherein the said means for measuring the piezoresistive effect includes one electrode affixed to a planar surface of said wafer.

4. A piezoresistive semiconductor stress gage comprising in combination a flat piezoresistive semiconductor wafer affixed to a member in which stresses are to be measured, means including an electrode attached to a flat surface of said wafer for electrically measuring the piezoresistive response in said semiconductor wafer in a direction approximately normal to the stresses appearing in said semiconductor wafer responsive to stresses in said stressed member.

5. The gage of claim 4 wherein the wafer is affixed to said member with an adhesive which has a greater conductivity than the semiconductor.

6. The gage of claim 5 wherein the said means for measuring the piezoresistive response further includes an electrode attached to said member and the said member acts as a conductor for the measuring current.

7. The gage of claim 4 wherein the minimum planar dimension of said wafer is at least twice the minimum corresponding planar dimension of the said electrode.

8. The gage of claim 4 wherein the minimum planar dimension of the said wafer is at least ten times the thickness of the wafer.

9. The gage of claim 4 additionally including a conductive spacer disposed between said wafer and said member, and said means for electrically measuring the piezoresistive response including an electrical lead attached to said spacer.

10. The gage of claim 4 additionally including a spacer disposed between said wafer and said member, said spacer comprising an insulating portion and a conductive portion, the conductive portion having an area which is coextensive and perpendicularly aligned with said electrode whereby the predominant current flow of said electrically measuring means is in a direction approximately normal to the plane of said wafer.

11. The gage of claim 4 wherein the piezoresistive wafer is oriented with respect to the said member such that the piezoresistive response in said normal direction is insensitive to stresses in one planar direction of the said wafer.

12. The gage of claim 11 wherein the piezoresistive wafer is oriented with respect to the said member such that the piezoresistive response in said normal direction is insensitive to shear stresses in the plane of said wafer.

References Cited in the file of this patent

UNITED STATES PATENTS

| | | |
|---|---|---|
| 2,249,933 | Beckmann | July 22, 1941 |
| 2,373,160 | Bollman et al. | Apr. 10, 1945 |
| 2,554,324 | Chambers | May 22, 1951 |
| 2,558,563 | Janssen | June 26, 1951 |
| 2,614,144 | Howatt | Oct. 14, 1952 |
| 3,031,634 | Vogt | Apr. 24, 1962 |